May 24, 1938.  G. W. HAMILTON  2,118,557
RETRACTABLE STEP FOR VEHICLES
Filed Aug. 17, 1936

INVENTOR,
Glen W. Hamilton.
BY Hovey & Hamilton
ATTORNEYS.

Patented May 24, 1938

2,118,557

UNITED STATES PATENT OFFICE 2,118,557

RETRACTABLE STEP FOR VEHICLES

Glen W. Hamilton, Independence, Mo., assignor of one-fourth to Vinton H. Rowlett, Kansas City, Mo.

Application August 17, 1936, Serial No. 96,359

5 Claims. (Cl. 280—166)

This invention relates to retractable steps, and particularly to retractable steps suitable for use on vehicles wherein it is desirable to retract the step to a position whereby it will be less apt to be interfered with during the moving of the vehicle.

The principal object of the invention is the provision of a retractable step having means whereby the step is secured in the extended or retracted position.

Another object of the invention is the provision of a retractable step having operating means adaptable to be moved in one direction to release the step securing means and to move said step to the desired position.

Other objects are simplicity and sturdiness of construction and ease and accuracy of operation.

With these and other objects, which will appear during the course of the specification, in view, reference will now be had to the drawing, wherein.

Figure 1:
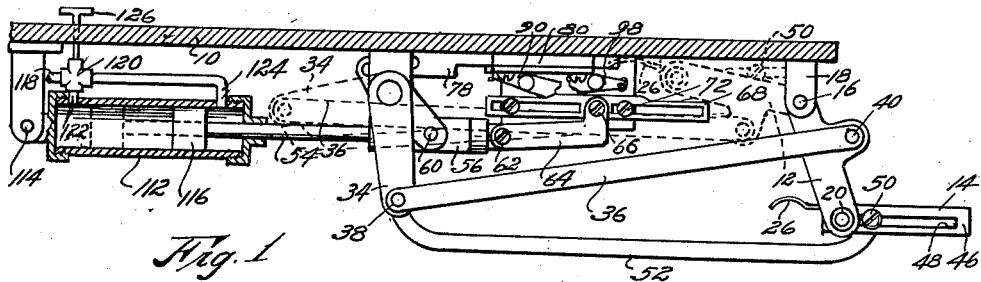
Figure 1 is a side elevation of a retractable step embodying this invention, with parts shown in dotted lines to indicate the retracted position.

Like reference characters designate similar parts throughout the several views, and the numeral 10 indicates a frame or support which might be the platform of a vehicle, to which the step of this invention leads. Also, this retractable step might be the lower step of a series of steps.

Figure 3:
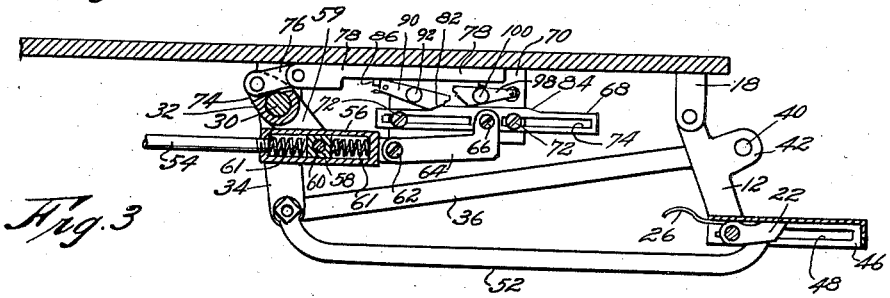
Fig. 3 is a sectional view taken on line III—III of Fig. 2.

Swingably mounted by means of spaced-apart links 12 is a step 14. The links 12 are pivoted at 16 to standards 18 which are securely attached to support 10. Rigidly secured to the outer ends of links 12 is a transverse shaft 20 which serves as a pivotal member for the step as shown. When the step is in the operative or extended position as shown in Fig. 3, it is supported in this position by means of stops 22 that are secured to shaft 20 by means of pins 24. As the step is swung to the retracted position as shown by dotted lines in Fig. 1, the stops 22 move away from the step and springs 26 secured to the rear edge of the step contact the under side of support 10 to hold the step in a substantially horizontal position beneath the support. These springs 26 also set up a tension between the parts, thereby eliminating much of the rattling, which might occur during the moving of the vehicle.

Rotatably mounted to the rear of step in brackets 28 carried by support 10, is a shaft 30, on which is rigidly secured a rocker arm 32. A radially disposed arm 34 is securely attached to each end of shaft 20. A connecting bar 36 at each side of the step is pivotally connected by pivot 38 at its one end to arm 34 and by pivot 40 at its other end to link 12 intermediate its ends. In order to obtain proper leverage for the movement of link 12, bar 36 is pivoted to the forwardly projecting boss 42 of link 12. The step 14 is urged to a position against stops 22 by springs 44.

As clearly shown, the step is provided with down-turned end aprons 46, each of which is provided with a longitudinal slot 48. Each of these slots is provided with a slidably mounted trunnion 50 that is securely mounted in one end of guide bar 52. The other end of bar 52 is mounted on pivot 38. Since the movement of arm 34 and link 12 is different, it is apparent that as the step is moved to and from the operative position the trunnion 50 will move along slot 48, and due to the relative positions of bar 52 and shaft 20, step 14 cannot move from a substantially horizontal position during its travel to or from the operative position.

The means for oscillating shaft 30 through rocker arm 32 and the means for securing the step in the operative and retracted or inoperative position, are interconnected and will be considered together.

An operating rod 54 is secured at its inner end to a spring housing 56, in which is mounted a block 58 on a pin 60, carried by the lower end 59 of rocker arm 32. Between the block and each of the opposite inner end walls of housing 56 is spring 61, which tends to maintain the block in a fixed position in the housing. However, under certain conditions, as hereinafter set forth, the operating rod and housing may be moved a predetermined distance against the action of springs 61 without oscillating the rocker arm 32. Whenever the rocker arm 32 is oscillated, shaft 30, together with arm 34, will oscillate through similar arcs and the links 12 will swing on pivot 16, due to the connecting bar 36. Pivotally connected at 62 to the forward end of housing 56 is an L-shaped link 64 which is pivoted at 66 to the central portion of slide bar 68. Slide bar 68 is mounted on a vertically disposed plate 70, carried by support 10, by means of pins 72 passing through slots 74 formed through the bar. Slots 70 are of sufficient length to permit movement of the parts to allow full operation of the step to and from the operative and retracted positions.

Pivotally mounted in the upper end 74 of rocker arm 32 is a link 76 which is interconnected with a slide bar 78 mounted for reciprocation against the lower surface of support 10 and held in position by guide 80 and the plate 70.

The upper face of slide bar 68 is provided with oppositely disposed, spaced-apart, beveled shoulders 82 and 84 respectively. Also, slide bar 78 is provided with spaced-apart stop pins 86 and 88 which depend therefrom.

Figure 4:
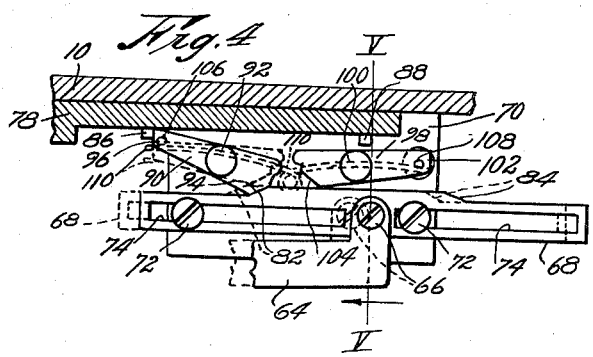
Fig. 4 is an enlarged, fragmentary elevation of the step securing mechanism shown in two positions, and, Fig. 5 is a sectional view, taken on line V—V of Fig. 4.
Figure 5:
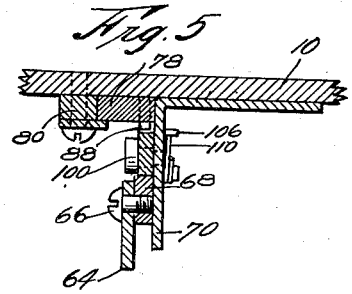

Referring now to Figs. 4 and 5, which clearly show the parts when the step is in the operative position, it will be noted that a pawl 90, pivoted at 92 to plate 70, is formed at 94 to contact the beveled shoulder 82, while the opposite end 96 thereof engages pin 86. When the parts are so positioned it is apparent that the step cannot be moved from the operative position by any pressure exerted against the step, due to the fact that slide bar 78 is secured against any forward movement by pawl 90 engaging pin 86. When it is desired to retract the step, the operator simply pulls rearwardly on operating rod 54, which moves the housing and its associated parts against the action of spring 60, so that as slide bar 68 is moved rearwardly, the pawl 90 is oscillated about 92 by the raising of 94 on the inclined shoulder 82, and 96 disengages pin 86, so that bar 78 is free to move outwardly and permit oscillation of shaft 30 and the resultant movement of the step from the operative position. This released position is clearly shown in dotted lines in Fig. 4. When the step is in the retracted position, panel 98 is so positioned on pin 100 that its forward end 102 will engage stop pin 88 while its rearwardly inclined end 104 will engage the beveled shoulder 84 of slide bar 68.

It is evident that likewise, when the step is thus secured in the retracted position it cannot be moved from that position by any pressure exerted against the step. However, it can be moved by simply exerting an outward pressure against operating rod 54, which will first cause the release of bar 78, then the movement of the step to the operative position.

Ends 96 and 102 of the pawls are respectively provided with protruding pins 106 and 108 under which rest a spring 110, carried by plate 70, that tends to urge said pawls against slide bar 78.

Figure 2:
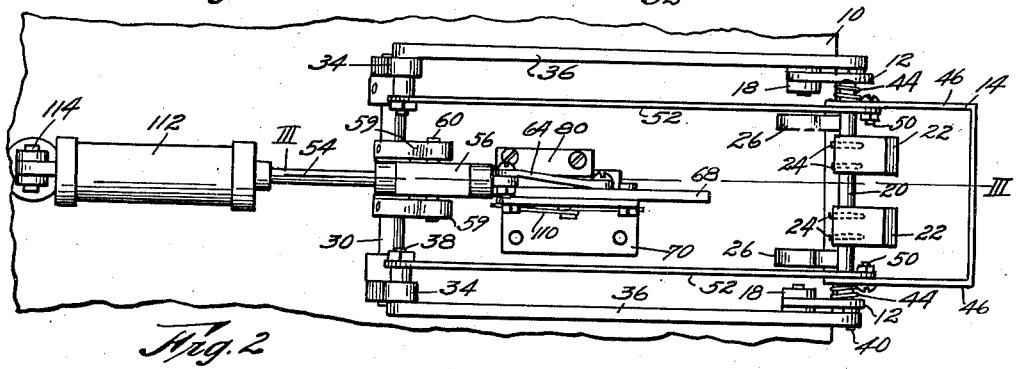
Fig. 2 is an inverted plan view of the step shown in Fig. 1.

Referring to Figs. 1 and 2, it will be noted that a means for operating rod 54 is provided. A cylinder 112, pivoted at 114, is adapted to receive a piston 116 secured on the end of rod 54. A fluid pressure pipe 118, having a suitable control valve 120, makes it possible to selectively discharge pressure fluid through pipe 122 or pipe 124 located at opposite ends of the cylinder. A valve operating means 126 may extend through the platform for convenience of operation. Manual means or any other mechanical means might be used to operate rod 54 without departing from the novel features of the invention.

Having thus described the invention, what is claimed as new and desired to be secured by Letters Patent is:

1. A retractable step for vehicles comprising a support; a step swingably mounted on spaced-apart links pivotally carried by said support; means for moving said step to and from the operative position, said means including a compressible spring member operable whereby said member is movable through a predetermined distance without moving said step; and securing means associated with said first named means operable by the initial movement of said compressible spring member to release said step moving means to permit movement of the step to or from the operative position.

2. A retractable step for vehicles comprising a support; a step swingably mounted on spaced-apart links pivotally carried by said support; means resiliently interconnected with said step adapted to move it to and from the operative position; means associated with said first named means whereby said step is secured in the operative and inoperative position; and said first named means being operable to first release said securing means and move the step to the desired position.

3. A retractable step for vehicles, comprising a support; a step swingably carried by said support; reciprocating means for moving said step to and from the operative position; means associated with said moving means to secure said step in the operative and retracted positions, said securing means being operable by the initial movement of said moving means to release said step, and means associated with said moving means to constantly maintain said step in a substantially horizontal position.

4. A retractable step for vehicles, comprising a support; a step swingably carried by said support; reciprocating means for moving said step to and from the operative position; resilient means associated with said moving means to secure said step in the operative and retracted positions, said securing means being operable by the initial movement of said moving means to release said step from its secured position and cause it to move by the action of said resilient means.

5. A retractable step for vehicles, comprising a support; a step mounted on links pivotally carried by said support; a lever pivoted intermediate its ends on a pin carried by said support; a link interconnecting one end of said lever to one of said pivoted step links; a reciprocably mounted locking bar interconnected with the other end of said lever; an operating rod resiliently interconnected with said lever; a slide bar carried by said support; a link interconnecting the end of said operating rod with said slide bar whereby the bar may be reciprocated; and pivoted pawls carried by said support and adapted to interengage said locking bar and slide bar, whereby said step is secured in the operative or retracted position, said pawls being so positioned that they are oscillated to the inoperative position by the initial movement of the operating lever to permit movement of said lever.

GLEN W. HAMILTON.